June 23, 1953  E. L. BOYCE ET AL  2,642,709
LAWN MOWER AND ACTUATING MEANS THEREFOR
Filed May 14, 1949  3 Sheets-Sheet 3

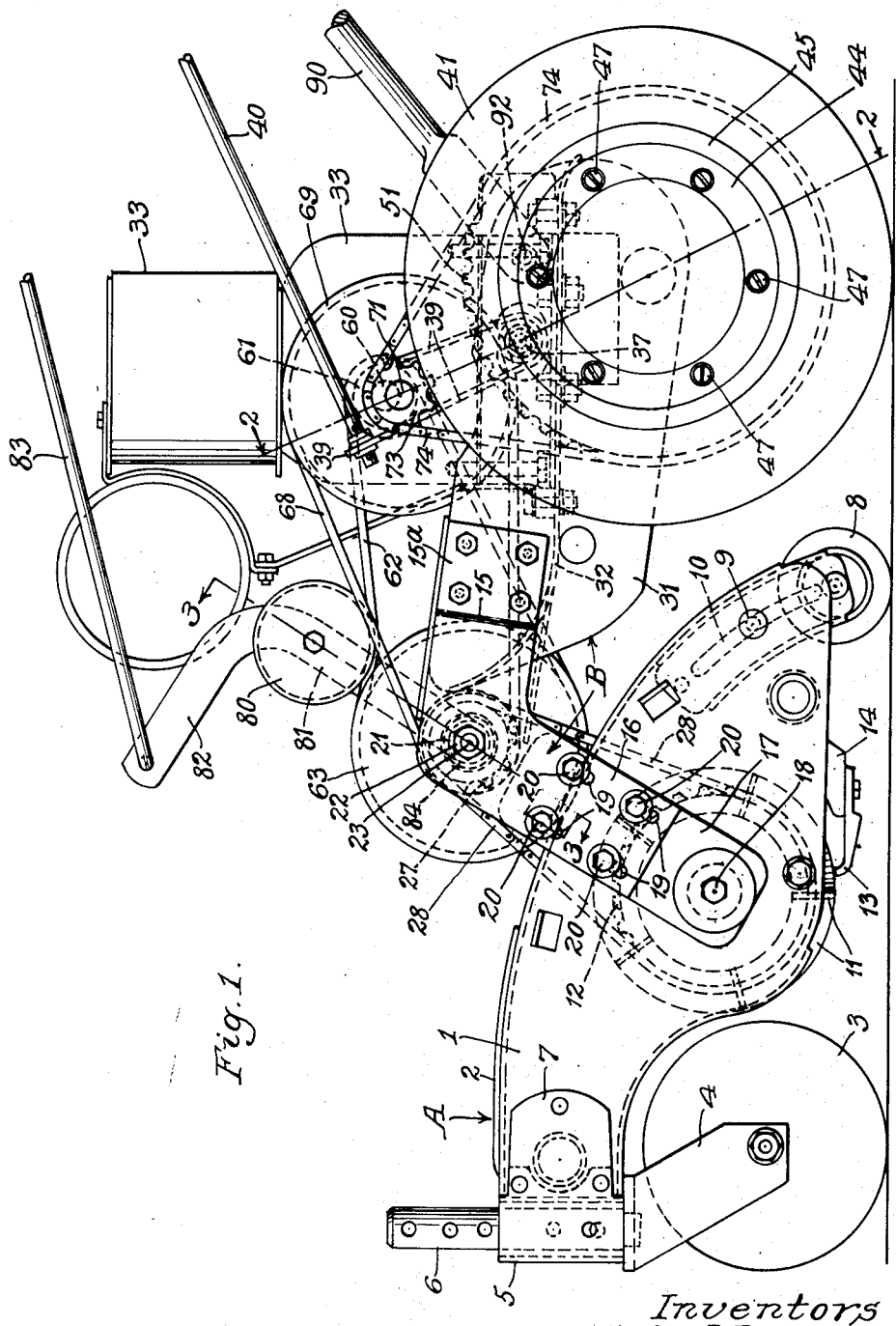

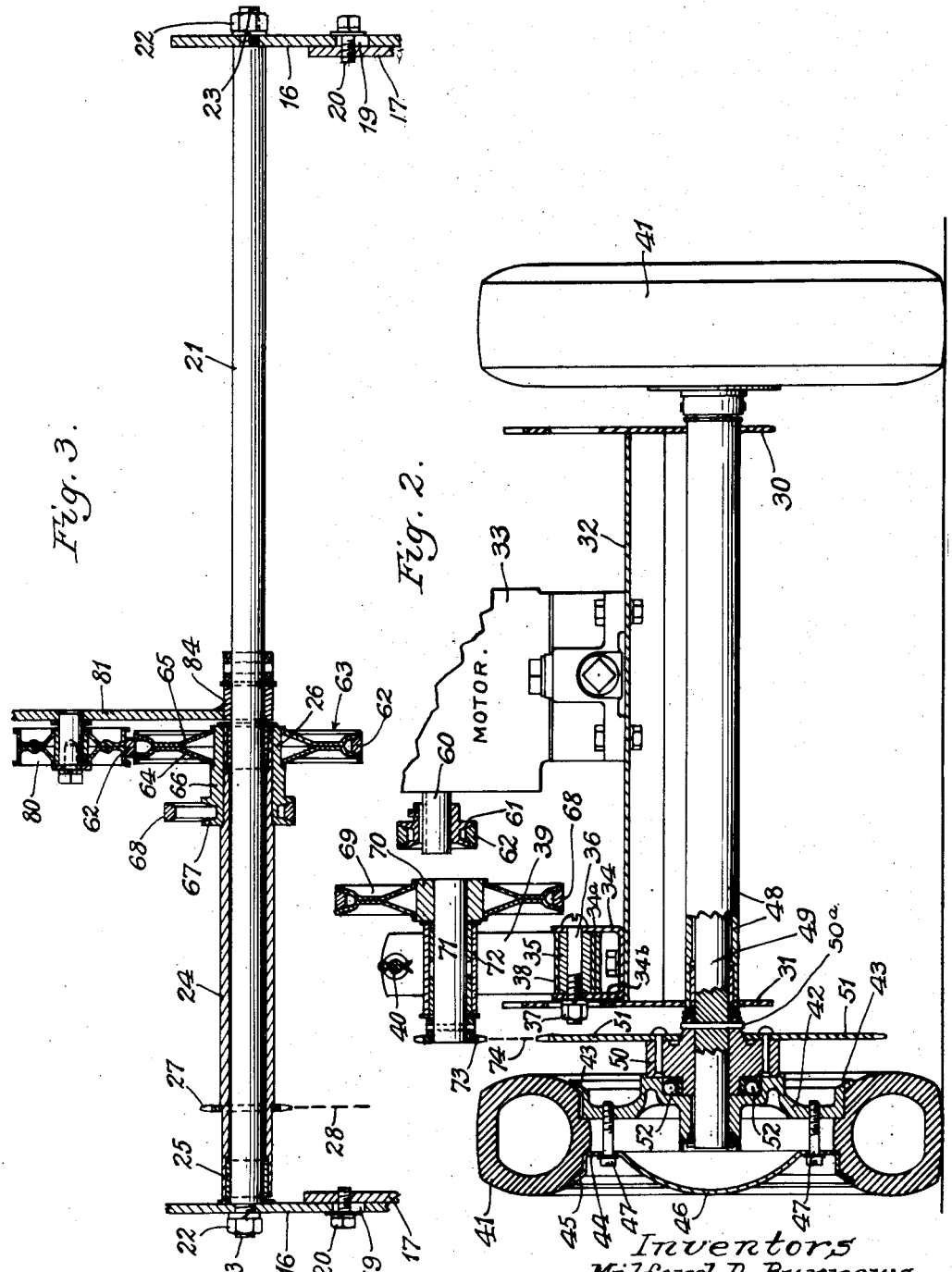

Inventors
Milford D. Burrows
Eugene L. Boyce
by Parker & Carter
Attorneys

Patented June 23, 1953

2,642,709

UNITED STATES PATENT OFFICE 2,642,709

LAWN MOWER AND ACTUATING MEANS THEREFOR

Eugene L. Boyce and Milford D. Burrows, Chicago, Ill., assignors to Pioneer Gen-E-Motor Corporation, Chicago, Ill., a corporation of Delaware Application May 14, 1949, Serial No. 93,294

5 Claims. (Cl. 56—26)

The invention relates to an improvement in lawn mowers and actuating means therefor, and has for one purpose to provide an improved lawn mower drive.

Another purpose is to provide an improved tractor which is adapted to drive and actuate lawn mowers and other equipment and which is supported in part upon the equipment it drives.

Another purpose is to provide improved control means for a lawn mower power plant.

Another purpose is to provide an improved handle assembly for a lawn mower power plant.

Other purposes will appear from time to time in the course of the specification and claims.

The invention is illustrated more or less diagrammatically in the accompanying drawings wherein:

Fig. 1 is a side elevation;

Fig. 2 in a section on the line 2—2 of Fig. 1, with certain parts broken away for clarity;

Fig. 3 is a section on the line 3—3 of Fig. 1; and

Figure 4:
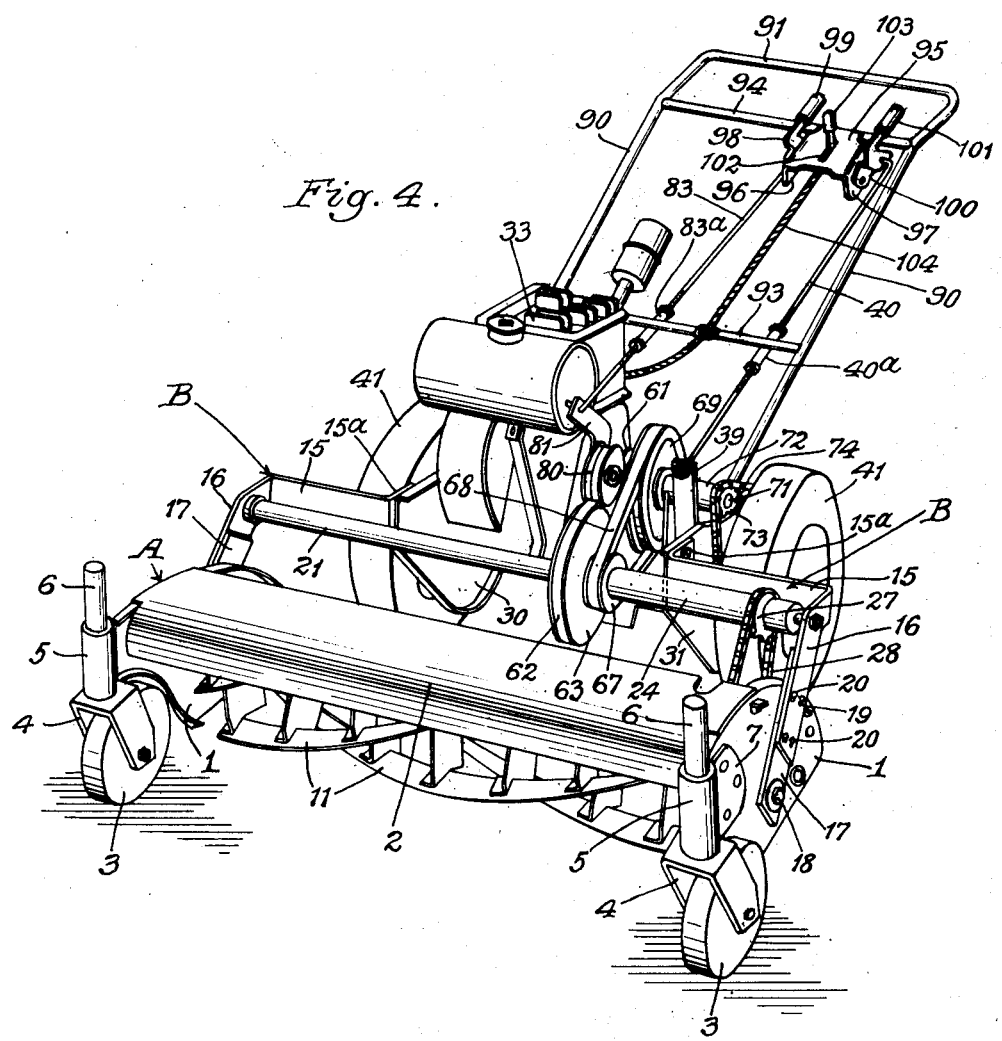
Fig. 4 is a perspective.

It will be understood that whereas the power plant and tractor is described and shown as applied to and used in connection with a lawn mower, it may equally readily be employed with other types of equipment.

Like parts are indicated by like symbols throughout the specification and drawings.

Referring to the drawings, A generally indicates the equipment to be driven or actuated. It is shown as including two end plates 1 connected by a top plate 2 and having forward ground engaging wheels 3 pivoted in forks 4 which are swivelled in vertical sockets 5 which receive pins 6 upwardly extending from the forks 4. The sockets 5 may form part of or be secured to the end plates 1. They are shown as including flange portions 7 which may be welded or otherwise secured to the outer surfaces of the end plates 1. It will be understood that the details of the mower A do not of themselves form part of the present invention and may be widely varied. The mower is shown as having rear ground engaging wheels or rollers 8 which may be mounted in any suitable manner, and which may be adjusted, for example, by adjustment of the securing screw or nut 9 along any suitable adjusting slot 10. Journalled within the end plates 1 is a cutter reel, the details of which do not of themselves form part of the present invention, the reel being generally indicated as 11. It is shown as including a sprocket 12 which rotates in unison with the reel, and through which the reel may be driven. 13 is any suitable cutter bar which may be adjustably mounted in a conventional manner on any suitable support 14 between the end plates 1. One form of adjustment could be the provision of a bolt and slot connection between the cutter bar 13 and support 14 for movement of the bar toward and away from the reel 11. This adjustment forms no part of the present invention.

There is thus provided a lawn mower chassis having swivelled forwardly positioned ground-engaging wheels 3 and a rear wheel or wheels or roller or rollers 8, whereby the cutting reel 11 and the cutter bar 13 may be adjusted in relation to the surface over which the chassis travels.

B generally indicates a tractor frame which is adjustably mounted upon the chassis A. It may include transversely extending members 15 with downwardly and forwardly extending portions 16 which are adjustably secured to mating members or strips 17 the forward and lower ends of which are secured as at 18 to the exterior surfaces of the end plates 1. Any suitable adjusting connecting means may be employed.

However, the drawings illustrate slots 19 through which extend any suitable bolts or screws 20.

Extending between the members 16 is a rod 21, which is illustrated in detail in Fig. 3. The rod is preferably held against rotation, being secured at each end, for example, by nuts 22 receiving bolt portions 23. Rotatable about the rod 21 is a sleeve 24 shown as having bearing members 25, 26 at its opposite ends. Movable in unison with the sleeve is a sprocket 27 about which passes any suitable sprocket chain 28 which in turn passes about and drives the sprocket 12 of the cutter reel. Other driving connections for the sleeve 24 will be indicated below.

The frame members 15 are shown as positioned in transverse alignment with each other and having at their inner ends rearwardly extending flanges or portions 15a. Secured to these flanges 15a are side frame members 30, 31. Extending between the members 30 and 31 is any suitable support 32 upon which is mounted any suitable motor 33, the details of which do not of themselves form part of the present invention. Mounted upon the platform or support 32 is a bracket 34 having opposite sides 34a and 34b between which is positioned a bearing sleeve 35 which may be secured by a screw 36 with its nut 37. Surrounding the sleeve 35 is any suitable eye element 38 which is secured to the upwardly extending arm 39 which receives at its upper end the actuating rod 40 which will later be described.

41 indicates generally ground-engaging tires mounted on any suitable wheel webs 42 shown as inwardly flanged as at 43. Outer wheel webs 44, flanged as at 45 and provided with a concave or convex portion 46 may be secured to the webs 42 as by screws 47, as will be clear from Fig. 2. 48 is a tube or sleeve mounted between and extending through the side frame members 30 and 31. Rotatable in it is the shaft or axle 49 to which is fixed an actuating hub 50 by means of key 50a. Secured to the hub 50 is a sprocket 51. 52 indicates any suitable over-running drive connection whereby, when the hub 50 is rotated in one direction, the wheels and the ground-engaging tires 41 are positively driven.

The motor is shown as having a drive shaft 60 with a drive pulley 61 channelled to receive the V-belt 62. The V-belt, in turn, passes about the channelled driven wheel 63. The pulley 63 is shown as formed of two sheet metal members 64, 65 which may engage the hub 66 with a pressed fit. The hub 66 may form part of or be firmly secured to the sleeve 24 for unitary rotation therewith and is shown as having a channelled end portion 67 which receives a V-belt 68. The V-belt 68 in turn passes about a pulley 69 which is similar to the pulley 63 and is mounted on a hub 70 on a short shaft 71 which rotates in a bearing sleeve 72 on the arm 39. At its opposite end the shaft 71 carries a sprocket 73 about which passes any suitable sprocket chain 74 effective to engage and drive the above described sprocket 51.

It will thus be clear than in response to the rotation of the motor shaft 60, the V-belt 62 rotates the sleeve 24, and through it drives the cutter reel 11 through the sprocket chain 28, and also drives the shaft 71 through the V-belt 68. Since the shaft 71 is effective to drive the ground-engaging wheels through the sprocket chains 74, the rotation of the motor shaft is effective both to actuate the ground-engaging propulsive wheels and the cutter reel.

The distance between the pulley 61 and the pulley 63, in relation to the length of the V-belt 62 is such that the belt is not normally effective to maintain a driving connection. A clutch connection is provided in the form of a pressure pulley 80 mounted on a lever arm 81 having an upper opposite portion 82 which receives an actuating rod 83. The lever 81 is suitably pivoted as at 84.

It will be understood, therefore, that when the parts are in the position in which they are shown in Fig. 1, the pressure pulley 80 holds the belt 62 in driving relationship and thus drives the sleeve 24 and its associated parts. But when the rod 83 is released to relax the pressure of the pulley 80, then the assembly idles, although the motor shaft is still rotating.

Assume that the parts are in the position in which they are shown in Figs. 1 and 4, with the motor shaft effectively connected, through the belt 62, with the sleeve 24, then the sleeve 24 is rotated and, through the sprocket chain 28, is driving the cutter reel. A second clutch connection is provided, however, for the drive of the ground-engaging wheels. The actuating rod 40, when it is used to move the lever 39 to tighten the belt 68, then is effective to complete the driving connection between the sleeve 24 and the shaft 71. Otherwise, the looseness of the belt 68 would prevent the drive of the ground-engaging drive wheels, even though the cutter reel 11 is being constantly driven by the sprocket chain 28. Thus two clutch connections are provided, permitting an operator adequately to control the operation of the device.

To provide convenient control or handle means, an actuating handle having side members 90 and a rear handle cross piece 91 is suitably connected to the motor supporting structure including the side plates 30, 31 and the cross plate support 32. Such connections are shown as at 92. The handle may also have intermediate cross pieces 93 and 94. The upper cross piece 94 is shown as including a control plate 95 having downwardly turned flanges 96, 97 at its opposite side edges. Pivoted to the flange 96 is the lever 98 with its handle 99. Pivoted to the flange 97 is the lever 100 with its handle 101. The lever 98 has secured to it the upper end of the control rod 83. The lever 100 has secured to it the upper end of the control rod 40. The control rods are provided with intermediate adjusting assemblies 83a and 40a, respectively. It will be understood that preferably the parts are so formed that the levers 98 and 100 are moved over center into the locking position, so that the tension of the rod 83 or of the rod 40 will hold its associated lever in the locked position and will maintain the desired clutching pressure upon the belts controlled by the individual levers. The plate 95 is also shown as slotted as at 102 to permit the passage of an actuating lever 103 which will control any suitable flexibly housed control wire structure 104, whereby the motor 33 may be suitably throttled or otherwise controlled.

It will be realized that whereas a practical and operative device has been shown, nevertheless, many changes may be made in size, shape, number and disposition of parts without departing from the spirit of the invention. It is, therefore, requested that the description and drawings be taken as in a broad sense illustrative or diagrammatic rather than as a limitation to the particular structure and parts herein described and shown. For example, whereas the device has been shown as used in connection with the actuation of a lawn mower chassis, it may be used to actuate other structures.

The use and operation of the invention are as follows:

The lawn mower chassis A, used as a typical piece of equipment to be actuated, is self-contained, in that it rests upon and is supported upon the ground, and carries a cutting reel 11 and a cutter bar 13. The cutting level may be adjusted by adjusting the roller or rollers 8 in relation to the chassis.

Mounted on and in part supported upon the chassis is a tractor structure which includes the ground-engaging wheels or tires 41 and the engine support 32 and its associated frame structure. It will be understood that this structure is supported at its forward end upon the chassis A, as by the members 16, 17. It will also be understood that it may readily be removed from the chassis. It carries the motor 33 which drives the cutter reel 11 and the ground engaging wheel or tires 41. The control rod 83 is effective to interrupt the drive and to permit the motor 33 to idle, since it controls the pressure roller or pulley 80 which, in turn, controls the driving tension of the belt 62. The lever handle 99 permits this clutching control to be readily, quickly and easily actuated by the hand of a user who is holding the handle cross piece 91. Similarly, the separate clutch rod 40 for the control of the wheel drive is easily controlled by the operator. The operator also has the engine under ready and independent control, by means of the actuating lever 103.

We claim:

1. In combination, in a motor driven mower, a cutter chassis, ground engaging wheels therefor, and a cutter reel rotatably mounted thereon, a motor chassis connected to said cutter chassis, ground engaging wheels therefor, and a motor mounted thereon, a power transmitting shaft rotatably mounted between said motor chassis and said cutter chassis and supported on said motor chassis, said shaft having a pulley, and a clutch belt thereabout, a motor driven pulley about which said belt passes, controllable means for controlling the tension on said belt, including an actuating element and a control handle therefor, and a driving connection from said shaft to said cutter reel.

2. In combination, in a motor driven mower, a motor chassis, ground engaging wheels therefor and a motor mounted thereon, a cutter chassis, a cutter reel rotatably mounted thereon, a handle structure secured to said motor chassis, said handle having a pair of side members spaced a substantial distance apart and connected at their lower ends to said chassis, said side members having a transversely extending and connecting handle portion at their upper outer ends and a transversely extending supporting member connecting them adjacent said handle portion, a control body secured to said supporting member adjacent one of said side members and a plurality of levers mounted thereon, an actuating and driving connection extending between the motor and the cutter reel, an actuating and driving connection extending between the motor and at least one of the ground engaging motor chassis wheels, a control connection extending between one of said levers and the motor, a control connection extending between another of said levers and the driving connection between the motor and the cutter reel, and a third control connection extending between a third of said levers and the driving connection between the motor and the motor chassis wheel or wheels.

3. In combination, in a motor driven mower, a motor chassis, ground engaging wheels thereon, a handle structure extending from said chassis, a power transmitting shaft rotatably mounted on said chassis, a drive pulley driven by said motor, a driven pulley on said shaft, a clutch belt thereabout, controllable means for controlling the tension on said belt, including an actuating element on said handle structure, a manual control element therefor, located in convenient relation to said handle structure, at least one driving connection extending from said power transmitting shaft, a separate rotatable shaft interposed between the transmitting shaft and the ground engaging wheels, a movable shaft support upon which said second shaft is rotatably mounted, aligned pulleys on said transmitting shaft and said second shaft, a flexible clutch member passing thereabout, a driving connection between said second shaft and said ground engaging wheels, and means for moving said shaft support and for thereby controlling the tension upon said clutch belt.

4. In combination, in a motor driven mower, a motor chassis, ground engaging wheels thereon, a handle structure extending from said chassis, a power transmitting shaft rotatably mounted on said chassis, a drive pulley driven by said motor, a driven pulley on said shaft, a clutch belt thereabout, controllable means for controlling the tension on said belt, including an actuating element on said handle structure, a manual control element therefor, located in convenient relation to said handle structure, at least one driving connection extending from said power transmitting shaft, a shaft interposed between said transmitting shaft and said ground engaging wheels, a movable shaft support upon which said shaft is rotatably mounted, aligned pulleys on said transmitting shaft and said last mentioned shaft, a flexible clutch member passing thereabout, a driving connection between said last mentioned shaft and said ground engaging wheels, and means for moving said shaft support and for thereby controlling the tension upon said clutch belt.

5. In combination, in a motor driven mower, a motor chassis, ground engaging wheels thereon, a handle structure extending from said chassis, a power transmitting shaft rotatably mounted on said chassis, a drive pulley driven by said motor, a driven pulley on said shaft, a clutch belt thereabout, controllable means for controlling the tension on said belt, including an actuating element on said handle structure, a manual control element therefor, located in convenient relation to said handle structure, at least one driving connection extending from said power transmitting shaft, a shaft interposed between said transmitting shaft and said ground engaging wheels, a movable shaft support upon which said shaft is rotatably mounted, aligned pulleys on said transmitting shaft and said last mentioned shaft, a flexible clutch member passing thereabout, a driving connection between said last mentioned shaft and said ground engaging wheels, and means for moving said shaft support and for thereby controlling the tension upon said clutch belt, including an actuating member mounted on said handle structure and having a manual control element located convenient to said handle structure.

EUGENE L. BOYCE.
MILFORD D. BURROWS.

References Cited in the file of this patent

UNITED STATES PATENTS

| Number | Name | Date |
| --- | --- | --- |
| 1,114,440 | Brix | Oct. 20, 1914 |
| 1,114,441 | Brix | Oct. 20, 1914 |
| 1,902,524 | Roth | Mar. 21, 1933 |
| 1,947,117 | Stegeman et al. | Feb. 13, 1934 |
| 2,329,952 | Speiser | Sept. 21, 1943 |
| 2,335,054 | Godwin | Nov. 23, 1943 |
| 2,368,290 | Donald | Jan. 30, 1945 |